United States Patent
Carter

[15] 3,643,060
[45] Feb. 15, 1972

[54] WELDING APPARATUS FOR RESURFACING BREAKER BARS

[72] Inventor: Kenneth G. Carter, 175 Virginia, Salt Lake City, Utah 84107

[22] Filed: June 29, 1970

[21] Appl. No.: 50,816

[52] U.S. Cl. ...........................219/125 R, 219/124, 219/76
[51] Int. Cl. .................................................B23k 9/12
[58] Field of Search ........................219/125 R, 124, 76

[56] References Cited

UNITED STATES PATENTS

| | | | |
|---|---|---|---|
| 3,185,814 | 5/1965 | Rossner et al. | 219/76 |
| 3,119,009 | 1/1964 | Zeller | 219/125 R |
| 3,135,856 | 6/1964 | Stone | 219/124 |
| 3,339,055 | 8/1967 | Carter | 219/76 |

Primary Examiner—R. F. Staubly
Assistant Examiner—Gale R. Peterson
Attorney—William S. Britt, C. Harvey Gold and David V. Trask

[57] ABSTRACT

This invention relates to a welding apparatus for resurfacing in situ elongated breaker bars of a rotary impact crusher. The apparatus is generally located externally of the crusher and laterally to an end of a breaker roll, said apparatus comprising a welding tip extending into the crusher and above the protruding breaker bar to be resurfaced. The apparatus further includes means for reciprocating said welding tip along the length of an elongated breaker bar and means for transversely displacing said welding tip. The apparatus further includes means for elevating said welding tip, means for propelling said welding tip along a straight path substantially parallel to an elongated breaker bar and support means located externally to the rotary impact crusher for supporting said reciprocating means, said elevating means and said displacing means.

13 Claims, 5 Drawing Figures

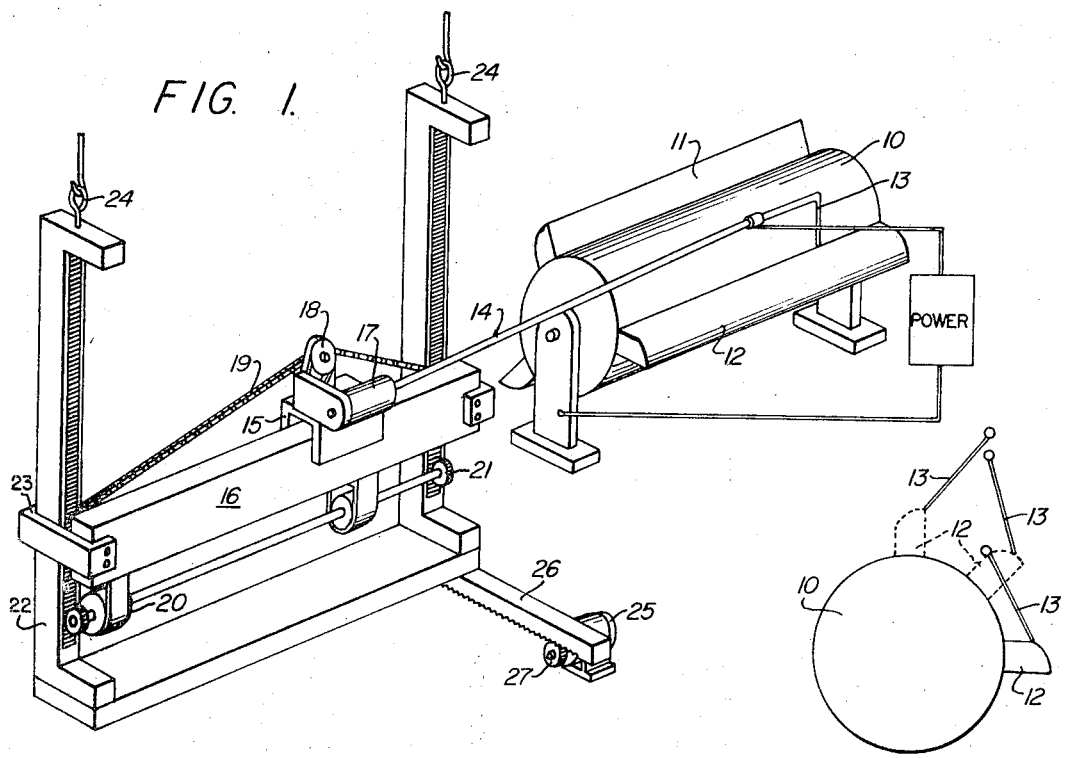
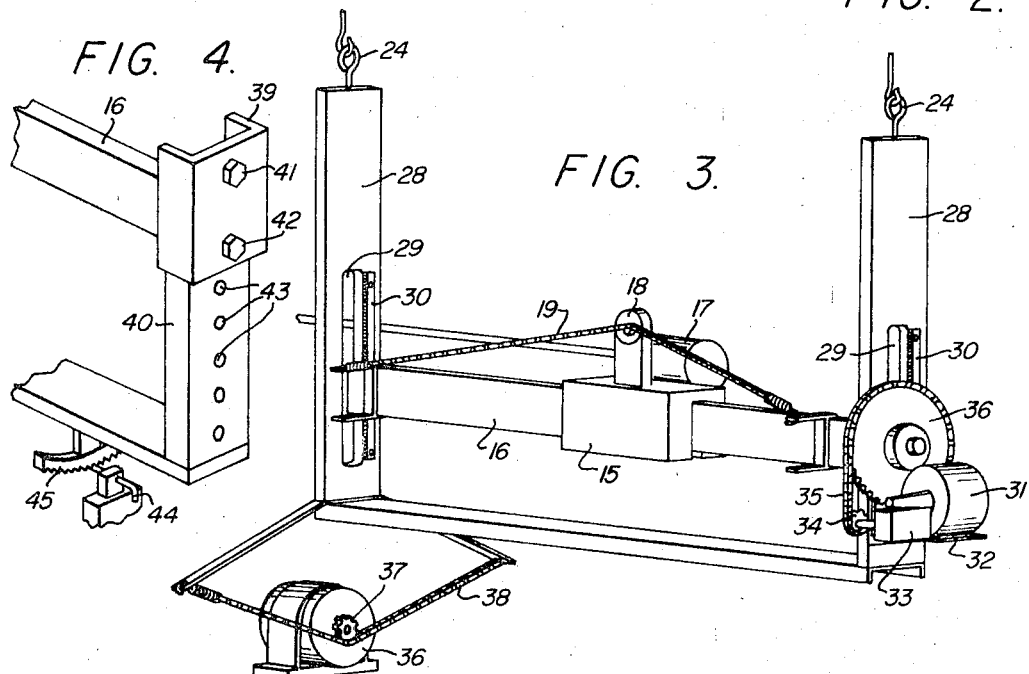
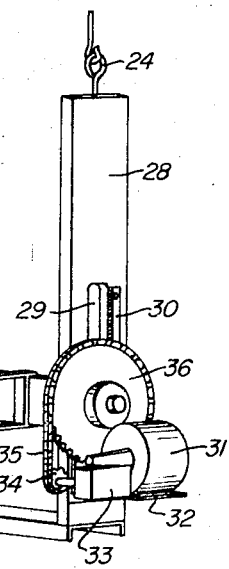
INVENTOR.
KENNETH G. CARTER
BY William S. Britt
ATTORNEY

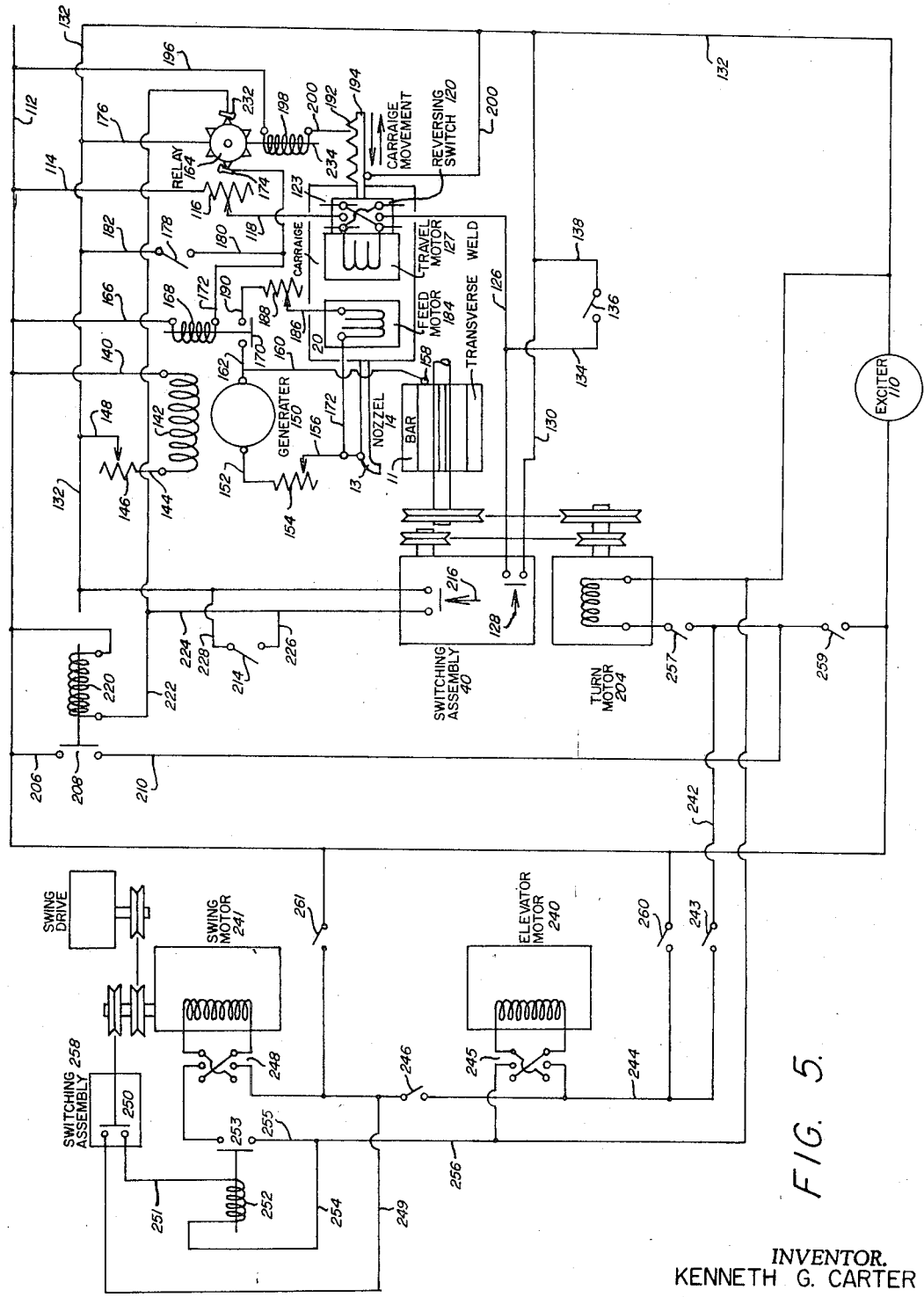

WELDING APPARATUS FOR RESURFACING BREAKER BARS

BACKGROUND OF INVENTION

The repair and resurfacing of rotary impact crushers having breaker bars extending radially from a cylindrically shaped core have presented problems to the art. The breaker bars extending radially from the cylindrical core have a substantial dimension along the surface of the core parallel to the axis of rotation and are substantially square or rectangular in cross section. After the breaker bar has been in service for some time the leading corner of the bar tends to wear so that the leading face and top surface of the bar become worn and a rounded or curved surface occurs. It is necessary then to resurface the bar so that a substantially square corner is present. This requires the deposition of metal by welding on the leading surface and on the top surface until a square corner is again present. The repair or resurfacing of the breaker bars by hand is difficult and time consuming inasmuch as a substantial portion of the superstructure of the rotary impact crusher must be removed to expose the breaker bars for welding.

A similar problem to that described hereinabove was present in the resurfacing of roll crushers. One invention solving that problem is described in U.S. Pat. No. 3,339,055 wherein a welding apparatus located externally to the roll crusher is described and claimed. The problems associated with the resurfacing of a rotary impact crusher are similar in some respects to resurfacing roll crushers, however, the repair of the former involves problems not associated with the repair of roll crushers.

OBJECTIVES OF THE INVENTION

It is an object of the instant invention to provide a rebuilding apparatus for resurfacing in situ elongated breaker bars of rotary impact crushers without the necessity of removing the superstructure of said crusher.

Another object of the instant invention is to provide a resurfacing apparatus for a rotary impact crusher which is located outboard from the crusher bars being rebuilt.

A further object of the instant invention is to provide an automatic welding apparatus for resurfacing in situ elongated breaker bars of a rotary impact crusher.

DESCRIPTION OF INVENTION

The foregoing objects and associated advantages are achieved by the welding apparatus of the instant invention. The welding apparatus comprises a welding tip preferably having a substantial vertical dimension extending into a rotary impact crusher. The welding tip is preferably provided with tubular welding wire by feeding means for feeding tubular welding wire to the surface of the breaker bar which is to be resurfaced wherein metal is deposited onto the surface of said bar by conventional welding techniques. Means are provided for reciprocating said welding tip along the length of an elongated breaker bar with feeding means adapted to coact with said reciprocating means so that tubular wire is continuously fed to said welding tip. The apparatus further includes means for transversely displacing or swinging said welding tip in an arc and means for elevating said welding tip. The swing means and elevating means are preferably associated with means for turning the rotary impact crusher core so that a worn surface is intermittently presented to the welding tip. The welding apparatus also includes means for guiding the welding tip along a straight path substantially parallel to the elongated breaker bar surface and preferably substantially parallel to the axis of rotation of the crusher. The welding apparatus further comprises support means located outboard of the rotary impact crusher. Said support means supporting said reciprocating means, said elevating means, and at least a portion of said transverse displacing or swinging means.

Description of the invention may be facilitated by reference to the accompanying drawings.

FIG. 1 is a perspective view of a simplified version of the resurfacing apparatus located outboard of a rotary impact crusher.

FIG. 2 is an elevational view of an end of a crusher roll exhibiting the position of the welding tip in relation to a breaker bar being resurfaced.

FIG. 3 is a perspective view of a portion of the welding apparatus illustrating elevator means, swing means, and reciprocating means.

FIG. 4 is a perspective view of a portion of the welding apparatus illustrating manual means for elevating and swinging a portion of the apparatus.

FIG. 5 is a schematic wiring diagram of the components used in the breaker rod resurfacer.

The operation and structure of the novel welding apparatus of this invention can be described by reference to FIGS. 1 and 2. In FIG. 1 there is illustrated a roll crusher element 10 with three breaker bars 11 extending radially therefrom. The crusher element illustrated would rotate in a counterclockwise direction and the breaker bars are illustrated as having their leading corner rounded into a curved surface 12. The worn curved surface 12 is also illustrated in FIG. 2. In resurfacing the worn surface it is necessary to have that portion of the surface which is being rebuilt placed in a substantially horizontal position inasmuch as the molten metal being applied thereto is very fluid and tends to run off sloped surfaces. Because of the fluidity of the molten metal it is necessary to rotate the breaker bars to different angular positions so as to place various portions of the curved surface in a substantially horizontal position for rebuilding. This is illustrated in FIG. 2 wherein the breaker bar is in a substantially horizontal position while the leading edge or face is being resurfaced. For resurfacing of the trailing edge of the top surface of the breaker bar it is found necessary to have the breaker bar in a substantially vertical position while portions of the surface between the leading and trailing edges are rebuilt at positions intermediate to the horizontal and vertical positions.

In FIG. 1 the rotary impact crusher element is illustrated in the absence of the superstructure which surrounds it. The rotary crusher element 10 is encased in a heavy metal enclosure which contains stationary grinding surfaces, a drive mechanism and power source for turning the crusher element and located above the crusher element 10 is a feed channel and a bin for aggregate material. If hand resurfacing of the breaker is practiced it is necessary to remove much of this heavy superstructure.

The mechanism illustrated in FIG. 1 is capable of moving the welding tip in a reciprocating fashion longitudinally along the breaker bar projection and is further capable of moving the welding tip in a vertical direction and transversely displacing or swinging the tip in arc about the upper support members supporting the welding apparatus. The welding tip 13 is connected by means of a hollow connecting tube or nozzle 14 to a carriage 15 which rides upon a rail 16. Tubular welding wire is fed through the connecting tube 14 and through the hollow welding tip 13 to deposit metal on the curved breaker bar surface 12. The tubular welding wire feed mechanism is not illustrated herein but it is similar in construction and function to the welding wire feed mechanism described in U.S. Pat. No. 3,339,055, and illustrated therein in FIGS. 3, 4, 5, 6, and 7, said figures and associated description being incorporated herein by reference.

A motor 17 drives a sprocket 18 which engages a chain 19 to cause the carriage 15 to move in a given direction as the sprocket 18 walks along the chain 19. The carriage reverses direction through reversal of the direction of flow of current through motor 17. The direction of flow of current through motor 17 may be controlled by limit switches located on the carriage or at either end of the rail so that contact of the limit switch with an appropriately located stop causes operation of a switch controlling current through the motor so that current flow reverses direction. Means for accomplishing this are now in the art and one useful assembly is described in U.S. Pat. No.

3,339,055 and illustrated in FIGS. 3 and 11, these figures and accompanying description being incorporated herein by reference.

An elevator motor 20 is illustrated in FIG. 1 as a means for elevating rail 16 and carriage 15 and connecting tubing 14 and welding tip 13 by driving gear 21 engaging a vertical rack 22. Brackets 23 hold the rail simply in close proximity to the rack 22 so that gear 21 stays in constant engagement with rack 22. The rail 16 and carriage assembly 15 may be raised or lowered by causing the motor to turn in opposite directions by reversal of current fed to elevator motor 20. The whole welding apparatus assembly illustrated in FIG. 1 is held in position by an A-frame or other superstructure from which racks 22 depend.

The welding assembly and tip 13 is caused to swing in an arc about its uppermost supports 24 by a swing motor 25 engaging a rack 26 disposed transversely to rail 16 through a gear 27. The motor is fixed to a stationary base and as it rotates causes the rack 26 to move transversely in relation to the path of reciprocation of welding tip 13. The direction of rotation of motor 25 can be controlled by the direction of current flow through said motor. The duration and direction of current flow can be controlled manually or automatically. An alternate means of moving tip 13 transversely comprises support means for said apparatus including slide rails so that the whole apparatus could be moved transversely by a rack and gear such as rack 26 and gear 27. The preferred means, however, is swing means such as that illustrated.

FIG. 3 illustrates another embodiment of the welding apparatus of this invention. The apparatus is supported by hooks 24 which may be supported by an A-frame or other structure of may depend from a cantilevered beam welded to the superstructure of the rotary crusher. The vertical racks or stanchions 28 have a portion of the rail 16 passing through vertical slots 29 in each stanchion so that a gear making contact with racks 30 will be held firmly against such racks to insure continuous engagement of the gear teeth with the rack teeth. An elevator motor 31 is attached to a platform 32 which depends from rail 16. Thus, motor 32 moves up and down with rail 16 thereby eliminating the need for a flexible drive linkage between the elevator motor and the gear engaging racks 30. The elevator motor 31, through a transmission 33, turns a small gear 34 which by means of a chain drive 35 drives larger gear 36. Rigidly connected to gear 36 is a small gear which engages rack 30 and which by means of a shaft extending through rail 16 engages rack 30 at the opposite end of the apparatus from the motor. The rail may be elevated and lowered by reversing the direction of current in elevator motor 31. Carriage 15 is caused to reciprocate on rail 16 by a reciprocating drive motor 17 which by means of a transmission drives gear 18 which walks along chain 19 to propell the carriage in a desired direction. Reversing direction of current flow in reciprocating motor 17 causes the motor to move in an opposite direction. A swing motor 39 turns a gear 37 which engages chain 38 to cause the welding apparatus to swing in an arc about support 24. The swing motor 39 is fixed to a support independent of the welding apparatus and may be attached to a support attached directly to the rotary crusher superstructure. The direction of rotation of swing motor 39 can be changed by changing direction of current flow in said motor.

Although the greatest utility of the instant invention resides in the use of the power assist means for the purpose of elevating the rail and welding carriage and swinging the assembly to a certain angular position. FIG. 4 illustrates manual means for elevating rail 16. Rail 16 is illustrated as being fastened to a channel member 46 which may be adjusted vertically on stanchion 40 by means of bolts 41 and 42 located at various heights on the stanchion engaging holes 43. The rail can be raised manually by elevating one end of the rail at a time by moving the rail upward to the next adjacent set of holes and then accomplishing the same feat with the other end of the rail. The angular adjustment of the apparatus can be adjusted by use of a pin 44 attached to a fixed support and adapted to engage a curved rack 45. The angular position of the welding assembly may be adjusted by disengaging pin 44, manually swinging the assembly laterally to a desired position and reengaging pin 44 in rack 45.

FIG. 5 shows a schematic wiring diagram of the welding apparatus for resurfacing breaker bars of a rotary crusher. In operating the apparatus, current is provided from a conventional source such as the welding machine exciter 110 to power travel motor 122, the field winding of generator 150, turn motor 204, feed motor 184, elevator motor 240 and swing motor 241. To power travel motor 122, current passes along lines 112 and 114 to rheostat 116, and thereafter, along line 118 to reversing switch 120 which controls the direction of said travel motor 122. As shown in FIG. 5 reversing switch 120 is designed to enable current to flow through travel motor 122 in opposite directions by shifting said reversing switch 120 so that it contacts lines 118 and 126 to complete a circuit with contacts on reversing switch 120 positioned along planes 123 and 124. Current passing through said travel motor 122 passes along line 126 through closed switch 128 of switching assembly 40 and along lines 130 and 132 to exciter 110. Travel motor 122 can also be activated when switch 128 of switching assembly 40 is open by closing function switch 136. When this is done, current passes from motor 122 along lines 126 and 134, through function switch 136. Thereafter said current passes along line 138, 130 and 132 to exciter 110.

Welding current is provided at tip 13 by passing a low amperage current from exciter 110 along lines 112 and 140 to field winding 142 of generator 150. The strength of the electromagnetic field of winding 142 is controlled by a rheostat 146 which is connected thereto by line 144. Current passes through said rheostat 146 along line 148 to line 132 and back to exciter 110. The electromagnetic field produced from winding 142 activates generator 150, creating a welding current which flows along line 152 to rheostat 154. Thereafter, said current flows along line 156 to nozzle 14 and tip 13. When tubular welding wire is passed through tip 13, current flows from said tip, along the wire to breaker bar 11 thereby forming a molten pool of welding metal on said bar. Said current then flows to grounding means 158, along lines 160 and 162 to generator 150. It is to be noted that when tubular welding wire is not moving through tip 13, current cannot pass between said tip and bar 11, that is, there is a gap between said tip 13 and bar 11 which is too large to maintain an electrical arc therebetween, thereby preventing further welding metal from being deposited.

Tubular welding wire is fed through nozzle 14 and tip 13 by feed motor 184. As shown in FIG. 5, said feed motor 184 is powered only when generator 150 is operating and when relay 164 or function switch 178 is closed. When relay 164 is closed current flows along line 112 and 166 to relay 168, thereby closing magnetic switch 170. From switch 170 said current flows along 172 to microswitch 174 which completes a circuit with said relay 164 when it is turned to a predetermined position. Description of relay switches corresponding to relay 164 is described and illustrated in U.S. Pat. No. 3,339,055, illustration FIG. 12 and accompanying description being incorporated herein by reference. Said current then flows from relay 164 along lines 176 and 132 and back to exciter 110. Relay 164 can be bypassed by closing function switch 178. When this is done, current flows along line 172 and 180 through said function switch 178 and along line 182 to return line 132. As previously indicated, when current flows through relay 168 magnetic switch 170 closes thereby allowing current to flow from generator 150 along line 152 through rheostat 154 and along lines 156 and 172 to feed motor 184. Thereafter, said current passes from said feed motor 184 along line 186 to rheostat 188, which controls the speed of the motor 184, and back to generator 150 along line 190 to closed switch 170 and finally along line 162 to generator 150.

Certain functions of the welding apparatus of this invention are controlled by relay 164 which may be a ratchet relay of the type described in U.S. Pat. No. 3,339,055, and illustrated therein as FIG. 12. The relay 164 is activated by microswitches 192 which are activated by the movement of a push rod 194. Microswitches 192 allows a circuit to be completed at predetermined intervals between lines 200 and 202. When this is done, current flows along lines 112 and 196 to coil 198 which activates a pawl 234 which, in turn, rotates relay 164. Current passes from coil 198 along line 200 through closed microswitches 192 and finally along lines 202 to return lines 132.

In the operation of the resurfacing welding apparatus, it is necessary to periodically rotate breaker bar 11 so that a worn, unresurfaced, substantially horizontal section is presented for resurfacing. The rotation of breaker bar 11 may be as synchronized with the elevation and swinging of welding tip 11 or the rotation, elevation, of the welding tip and swinging of the welding tip may be conducted in sequential fashion. If the swing motor, elevator motor and turn motor are operated in sequential fashion the order of operation is largely discretionary with an operator of the welding apparatus although in the rotation of the breaker bar from a lower position to an upper position it is preferred to operate the swing motor or elevator motor, or both, so that the welding tip has moved upwardly from its previous position so that it will not interfere with rotation of the breaker bar. The operation of the turn motor 204, elevator motor 240, and swing motor 241 may be conducted manually or the operation of the three motors may be interlocked electrically and preprogrammed so that the swing motor will swing the welding tip a predetermined number of degrees, the elevator motor will elevate the welding tip a certain predetermined distance and turn motor will rotate the breaker bar a predetermined angle.

The schematic diagram set forth in FIG. 5 provides for circuitry to deposit automatically welding metal along the length of breaker bar 11. In depositing metal longitudinally along the breaker bar the resurfacing apparatus functions in the following manner. Exciter 110 is activated which creates an electromagnetic field in generator 150, wherein said generator is rotated to produce a welding current. Travel motor 122 and feed motor 184 are powered when carriage 20 starts to move longitudinally in relation to breaker bar 11 and tubular wire is fed through nozzle 14 to tip 13. When said tubular wire passes through tip 13 welding current passes from said tip to breaker bar 11 and thereby causes an arc which melts said welding wire to deposit metal on breaker bar 11. Since carriage 20 is moving in a longitudinal direction in relationship to breaker bar 11, said welding metal is deposited along a longitudinal path on the surface of bar 11. As tip 13 approaches the end of bar 11, push rod 194 closes microswitch 192 which activates advancing pawl 234 to rotate relay 164 to a position which prevents current from flowing to feed motor 184 by opening switch 170 thereby stopping said feed motor 184. When this occurs, welding current no longer passes between tip 13 and bar 11 since welding wire is no longer passing through said tip. Welding is thereby discontinued at the end of each pass. A second microswitch 192 is operated by the movement of push rod 194 which advances relay 164 after a predetermined number of longitudinal cycles has occurred, thereby closing switch 208 to start turning motor 204 and slowing travel motor 122. Bar 11 may then be rotated a predetermined distance at which time locking switch 216 automatically opens thereby opening switch 208 which prevents current from flowing to motor 204. The type of switch useful in switch 216 is illustrated in FIG. 13 of U.S. Pat. No. 3,339,055, said illustration and the accompanying description being incorporated herein by reference. Travel motor 122 again speeds up to a set speed for another longitudinal pass of carriage 20, but now moving in a direction opposite from the direction it traveled during the previous longitudinal welding operation. The rotation of travel motor 122 is automatically reversed by reversing switch 120, which is activated by push rod 194 when tip 13 reaches a position proximate the edge of breaker bar 11. As tip 13 beings to move back across bar 11 breaker switch 192 is again closed thereby advancing relay 164 to send current to feed motor 184. When this occurs welding wire begins to pass through nozzle 14 allowing current to flow between tip 13 and bar 11 wherein it is deposited in a second longitudinal path on said bar 11. This operation is repeated until longitudinal wells have been placed to a desired depth on bar 11.

Turn motor 204 may also be operated manually by closing function switch 214 which permits current to flow from line 132 through line 228, switch 214, line 226 and line 224, thence through line 222 to pass through coil 220 to be returned to exciter 110. Activation of relay 220 closes switch 208 and permits current to flow from exciter 110 through line 206, through switch 208 and line 210 to motor 204.

The operation of swing motor 241 and 240 may be interconnected with turn motor 204 so that all three motors function substantially simultaneously. This may occur upon closing of relay 220 and the flowing of current along line 210 to motor 204 and through line 242 through closed function switch 243 through line 244 through reversing switch 245 to operate elevator motor 240. Elevator motor 240 may be interconnected in parallel with swing motor 241 so that current flowing through line 244 may pass through closed function switch 246 and thence through line 247 through reversing switch 248 to operate swing motor 241. Function switch 246 is inserted so that the operation of swing motor 241 may be separated, if desired, from the operation of motor 240 by opening a switch 246. The flow of current through 246 also passes through line 249 through closed switch 250 along line 251 and through relay 252 to close switch 253, thus permitting current to return along lines 254 and 255 through line 256 to exciter 110.

The operation of turn motor 204 may be separated from the operation of swing motor 241 and elevator motor 240 by opening of function switch 257 thereby permitting manual control of turn motor 204 in connection with the automatic control of swing motor 241 and elevator motor 240. It is preferred generally, to have switching assembly 40 to be associated with the first motor to be operated so that closing of switch 216 will provide current for continuing operation of the motors until their function is complete. Each motor may be associated with a switching assembly such as the switching assembly 258 associated with swing motor 241 which is mechanically connected to the motor and may be programmed to open after a set period of time or after a predetermined number of revolutions of the motor or after a predetermined angle of swing is obtained so that the switch opens after the motor attains its predetermined function. This, each motor although being operated substantially simultaneously needed not need operate for the same period of time. Switch 208, however, must remain closed until the motor requiring longest operating period has completed its function.

The reverse switches associated with swing motor 241 and 240 may be manually operated inasmuch as once a welding operation has begun the rotation of said motor is generally in the same direction until resurfacing of a particular bar is completed. For example, if resurfacing of breaker bars is begun in a substantially horizontal position then the breaker bar is rotated in a direction such that the last welding passes are made with the bar in a substantially vertical position so that the elevator motor is operated in a direction such as to elevate the welding tip for each succeeding pass while the swinging motor will tend to swing the tip in the same direction for each succeeding pass. This may be further understood by referring to FIG. 2 and the accompanying description set forth hereinabove.

Although the turn motor 204, elevator motor 240, and swing motor 241 may be operated in a substantially automatic fashion by the use of switching assemblies such as switching assembly 258 and switching assembly 40 or through the use of time delay switches which permit the motor to operate for a predetermined time which may be a different time for each succeeding stage of the welding operation, manual operation of these motors may also be accomplished. Turn motor 204 may be operated manually by closing of function switches 257 and 259 with function switch 243 in an open position. Elevator motor 240 may be operated independently of the operation of swing motor 241 and turn motor 204 by opening of switches 243 and 246 and closing of switch 260. In a similar fashion swing motor 241 may be operated independently of turn motor 204 and elevator motor 240 by opening of switches 243 and 246 and closing of function switch 261.

The welding apparatus is easily placed in position for resurfacing a worn breaker bar. The support members may be properly positioned and the frame supporting the carriage, elevating means and the like suspended therefrom. A support member for the nozzle and welding tip which is an elongated frame which is attached to the rail so that the support member elevator and swings within the nozzle and tip is inserted into the crusher and the welding tip positioned in relation to the breaker bar in preparation for the first pass.

The resurfacing welding apparatus of this invention is especially advantageous inasmuch as it is mounted outboard from the rotary breaker bars during the resurfacing operation. This permits the bars to be resurfaced without the difficulties encountered in hand-welding by an operator within the crusher being subjected to smoke, dirt and weldspatter which permits welding only for a few minutes at a time. Furthermore, the outboard mounting permits most of the welding apparatus to be outside of the area of weldspatter, smoke and dirt. Also, all of the welding components other than the nozzle and welding tip are mounted where they can be observed for proper function and operation. As indicated hereinabove, the welding apparatus may be suspended from an A-frame support or other frame so that the welding apparatus is supported in a swinging fashion.

Although the invention has been described hereinabove, by reference to a specific embodiment, it is not intended that the invention be limited solely thereto but to include all the variations and modifications falling within the scope of the appended claims.

I claim:

1. A welding apparatus for resurfacing in situ elongated breakers bars of a rotary impact crusher comprising:
   a. a welding tip adapted to extend into a rotary impact crusher connected by an elongated member to reciprocating means,
   b. means for reciprocating said elongated member and said welding tip in welding relation along the length of said elongated breaker bar, said reciprocating means located externally to an end of said breaker bar,
   c. means for laterally transporting said welding tip in a substantially vertical arc transversely from the longitudinal axis of said breaker bar,
   d. means for elevating said welding tip and elongated member connected thereto, said elevating means located externally to an end of said breaker bar,
   e. means for guiding said welding tip along a straight path substantially parallel to said elongated breaker bar, said guide means located externally to an end of said breaker bar, and
   f. frame means located laterally to an end of said breaker bar for supporting said reciprocating means, said elevating means and said guide means.

2. The apparatus of claim 1 wherein said reciprocating means comprises carriage means mounted on a support rail which is substantially parallel to said breaker bar, said carriage means connected to drive means for propelling said carriage means along said rail, said carriage means connected to said welding tip by a hollow member.

3. The apparatus of claim 2 wherein said drive means for propelling said carriage means is provided with automatic reversing means for reversing the direction of travel of said carriage means on said rail when said welding tip is at a point proximate an end of said breaker bar.

4. The apparatus of claim 2 wherein said elevating means comprises drive means for propelling said carriage means and support rail vertically.

5. The apparatus of claim 4 wherein said elevator drive means comprises an electrically operated motor driving a rotary gear which engages a vertical rack supported by said frame means.

6. The apparatus of claim 1 wherein said lateral transport means comprises means for swinging said welding tip in an arc.

7. The apparatus of claim 6 wherein said swing means comprises drive means for propelling said frame means supporting said reciprocating means and said elevating means in an arc, said frame means being suspended from a fixed support.

8. The apparatus of claim 1 wherein turning means for turning said breaker bars is provided.

9. The apparatus of claim 8 wherein said turning means, said swing means, and said elevating means are electrically interconnected to function in a cooperative manner.

10. The apparatus of claim 8 wherein said turn means is programmed to turn said breaker bar a predetermined distance, said elevating means is programmed to elevate said welding tip a predetermined distance and said swing means is programmed to swing said welding tip a predetermined angular displacement.

11. The apparatus of claim 10 wherein said turn means, said elevating means and said swing means are programmed to function in sequential fashion.

12. The apparatus of claim 10 wherein said turn means, said elevating means and said swing means are programmed to function in substantially simultaneous fashion.

13. The apparatus of claim 1, wherein tubular welding is fed to said welding tip by wire feed means.

* * * * *